United States Patent [19]

Niessner et al.

[11] Patent Number: 5,290,859
[45] Date of Patent: Mar. 1, 1994

[54] THERMOPLASTIC MOLDING MATERIALS BASED ON POLYCARBONATES, STYRENE/ACRYLONITRILE POLYMERS AND POLYOLEFINS

[75] Inventors: Norbert Niessner, Friedelsheim; Klaus Muehlbach, Gruenstadt, both of Fed. Rep. of Germany

[73] Assignee: BASF Aktiengesellschaft, Ludwigshafen, Fed. Rep. of Germany

[21] Appl. No.: 906,722

[22] Filed: Jun. 30, 1992

[30] Foreign Application Priority Data

Jul. 3, 1991 [DE] Fed. Rep. of Germany ....... 4121975

[51] Int. Cl.$^5$ .................. C08L 51/00; C08L 69/00
[52] U.S. Cl. ........................ 525/67; 525/64; 525/71; 524/504
[58] Field of Search .............. 524/504; 525/67, 71

[56] References Cited

U.S. PATENT DOCUMENTS

| | | | |
|---|---|---|---|
| 4,384,076 | 5/1983 | Ohara et al. | 525/67 |
| 4,430,476 | 2/1984 | Liu | 525/67 |
| 4,438,229 | 3/1984 | Fujimori et al. | 524/504 |
| 4,503,183 | 3/1985 | Liu | 524/504 |
| 4,504,626 | 3/1985 | Liu | 525/146 |
| 4,520,164 | 5/1985 | Liu | 525/67 |
| 4,666,985 | 5/1987 | Liu | 525/146 |
| 4,677,162 | 6/1987 | Grigo et al. | 525/67 |
| 4,683,265 | 7/1987 | Kress et al. | 524/504 |
| 4,783,494 | 11/1988 | Allen | 525/67 |
| 4,826,918 | 5/1989 | Kress et al. | 525/67 |
| 4,880,875 | 11/1989 | Wassmuth et al. | 524/504 |
| 4,880,876 | 11/1989 | Hub et al. | 525/67 |
| 4,895,897 | 1/1990 | Kaufman | 525/147 |
| 4,895,898 | 1/1990 | Kress et al. | 524/504 |
| 4,908,422 | 3/1990 | Leitz et al. | 525/67 |
| 5,126,404 | 6/1992 | Thomas et al. | 525/67 |

FOREIGN PATENT DOCUMENTS

| | | |
|---|---|---|
| 0110222 | 6/1984 | European Pat. Off. |
| 0111851 | 6/1984 | European Pat. Off. |
| 0207388 | 1/1987 | European Pat. Off. |
| 0230914 | 8/1987 | European Pat. Off. |
| 0244856 | 11/1987 | European Pat. Off. |
| 322095 | 10/1988 | European Pat. Off. |
| 3202477 | 8/1982 | Fed. Rep. of Germany. |
| 3300857 | 8/1983 | Fed. Rep. of Germany. |
| 8601409 | 1/1988 | Netherlands. |

*Primary Examiner*—Paul R. Michl
*Assistant Examiner*—Olga Asinovsky
*Attorney, Agent, or Firm*—Keil & Weinkauf

[57] ABSTRACT

Thermoplastic molding materials contain, as essential components,
A) polycarbonates,
B) graft polymers,
C) styrene copolymers and
D) polyolefins.

7 Claims, No Drawings

THERMOPLASTIC MOLDING MATERIALS BASED ON POLYCARBONATES, STYRENE/ACRYLONITRILE POLYMERS AND POLYOLEFINS

The present invention relates to thermoplastic molding materials containing, as essential components, A) from 10 to 88.9% by weight of at least one polycarbonate,
B) from 10 to 50% by weight of at least one graft polymer consisting of
  b$_1$) from 40 to 80% by weight of a grafting base of an elastomeric polymer based on alkyl acrylates where the alkyl radical is of 1 to 8 carbon atoms and having a glass transition temperature below 10° C. and
  b$_2$) from 20 to 60% by weight of a graft of
    b$_{21}$) from 50 to 95% by weight of styrene or a substituted styrene of the general formula I

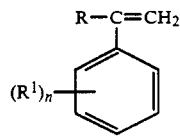

where R is alkyl of 1 to 8 carbon atoms or hydrogen, R$^1$ is alkyl of 1 to 8 carbon atoms and n is 0, 1, 2 or 3, or a C$_1$-C$_8$-alkyl (meth)acrylate or a mixture thereof and
    b$_{22}$) from 5 to 50% by weight of acrylonitrile, methacrylonitrile, C$_1$-C$_8$-alkyl (meth)acrylates, maleic anhydride or maleimides N-substituted by C$_1$-C$_8$-alkyl or C$_6$-C$_{20}$-aryl groups or a mixture thereof,
C) from 1 to 79.9% by weight of a thermoplastic copolymer of
  c$_1$) from 50 to 95% by weight of a styrene or substituted styrene of the general formula I or a C$_1$-C$_8$-alkyl (meth)acrylate or a mixture thereof and
  c$_2$) from 5 to 50% by weight of acrylonitrile, methacrylonitrile, C$_1$-C$_6$-alkyl (meth)acrylates, maleic anhydride or maleimides N-substituted by C$_1$-C$_8$-alkyl or C$_6$-C$_{20}$-aryl groups or a mixture thereof,
D) from 0.1 to 40% by weight of at least one polyolefin and
E) from 0 to 50% by weight of a fibrous or particulate filler or a mixture thereof.

The present invention furthermore relates to the use of these thermoplastic molding materials for the production of fibers, films and moldings and to the moldings obtainable and consisting of the thermoplastic molding materials.

Owing to their property profile, thermoplastic molding materials based on polycarbonates and styrene/acrylonitrile copolymers have a very wide range of applications, for example in automotive construction, in the building sector, for office machines and in electrical and household appliances.

Thermoplastic molding materials based on polycarbonates, polyolefins and butadiene-based graft copolymers with copolymers of styrene and acrylonitrile are disclosed in, for example, DE-A 33 00 857. Although these blends have good toughness, the stability to weathering is unsatisfactory.

EP-A 322 095 describes blends of polyethylene terephthalate, polycarbonate, polyolefins and grafted EPDM rubbers. However, as in the case of the blends described in NL-A 8 601 409 and consisting of polycarbonates and phosphoric acid with or without polyolefins and rubbers, these blends have disadvantages in the mechanical properties.

The addition of polyolefins to polycarbonates is disclosed in, for example, U.S. Pat. No. 4,504,626. This gave products having satisfactory stress cracking resistance and improved impact strength compared with pure polycarbonate, but the multiaxial toughness is unsatisfactory.

It is an object of the present invention to provide thermoplastic molding materials which do not have the stated disadvantages.

We have found that this object is achieved, according to the invention, by the thermoplastic molding materials defined at the outset and based on polycarbonates, styrene/acrylonitrile copolymers and polyolefins. We have furthermore found the use of these thermoplastic molding materials for the production of fibers, films and moldings, and the moldings obtainable and consisting of the thermoplastic molding materials.

The novel thermoplastic molding materials contain, as component A), from 10 to 88.9, preferably from 40 to 75%, by weight of at least one polycarbonate.

Examples of suitable polycarbonates are those based on diphenols of the general formula II

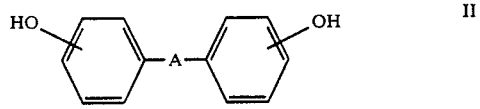

where A is a single bond, C$_1$-C$_3$-alkylene, C$_2$- or C$_3$-alkylidene, C$_3$-C$_6$-cycloalkylidene, —S— or —SO$_2$—.

Preferred diphenols of the formula II are, for example, 4,4'-dihydroxybiphenyl, 2,2-bis-(4-hydroxyphenyl)-propane, 2,4-bis-(4-hydroxyphenyl)-2-methylbutane and 1,1-bis-(4-hydroxyphenyl)-cyclohexane. 2,2-Bis-(4-hydroxyphenyl)-propane and 1,1-bis-(4-hydroxyphenyl)-cyclohexane are particularly preferred.

Both homopolycarbonates and copolycarbonates are suitable as component A), the bisphenol A homopolymer as well as the copolycarbonates of bisphenol A being preferred.

The suitable polycarbonates may be branched in a known manner, preferably by the incorporation of from 0.05 to 2.0 mol %, based on the sum of the diphenols used, of at least trifunctional compounds, for example those having three or more phenolic OH groups.

Furthermore, the polycarbonates which are suitable as component A) may be monosubstituted to trisubstituted on the aromatic units by halogen, preferably by chlorine and/or bromine. However, halogen-free compounds are particularly preferred.

Polycarbonates which have relative viscosities $\eta_{rel}$ of from 1.10 to 1.50, in particular from 1.25 to 1.40, have proven particularly suitable. This corresponds to weight average molecular weights Mw of from 10,000 to 200,000, preferably from 20,000 to 80,000.

The diphenols of the general formula II are known per se or can be prepared by known processes.

The polycarbonates can be prepared, for example, by reacting the diphenols with phosgene by the phase boundary method or with phosgene by the process in the homogeneous phase (i.e. the pyridine process), the particular molecular weight to be established being obtained in a known manner by means of a corresponding amount of known chain terminators. (Regarding polydiorganosiloxane-containing polycarbonates, see, for example, German Laid-Open Application DOS 3,334,782.)

Examples of suitable chain terminators are phenol and p-tert-butylphenol as well as long-chain alkylphenols, such as 4-(1,3-tetramethylbutyl)-phenol according to German Laid-Open Application DOS 2,842,005 or monoalkylphenols or dialkylphenols having a total of 8 to 20 carbon atoms in the alkyl substituents, according to DE-A 35 06 472, for example p-nonylphenol, 3,5-di-tert-butylphenol, p-tert-octylphenol, p-dodecylphenol, 2-(3,5-dimethylheptyl)-phenol and 4-(3,5-dimethylheptyl)-phenol.

Further suitable polycarbonates are those based on hydroquinone or resorcinol.

The novel thermoplastic molding materials contain, as component B), from 10 to 50, preferably from 10 to 25%, by weight of at least one graft polymer consisting of $b_1$) from 40 to 80, preferably from 50 to 70%, by weight of a grafting base of an elastomeric polymer based on alkyl acrylates where the alkyl radical is of 1 to 8 carbon atoms and having a glass transition temperature below 10° C. and $b_2$) from 20 to 60, preferably from 30 to 50%, by weight of a graft of $b_{21}$) from 50 to 95, preferably from 60 to 80%, by weight of styrene or a substituted styrene of the general formula I or a $C_1$–$C_8$-alkyl (meth)acrylate or a mixture thereof and $b_{22}$) from 5 to 50, preferably from 20 to 40%, by weight of acrylonitrile, methacrylonitrile, $C_1$–$C_8$-alkyl (meth)acrylates, maleic anhydride or maleimides N-substituted by $C_1$–$C_8$-alkyl or $C_6$–$C_{20}$-aryl groups or a mixture thereof.

Suitable polymers for the grafting base $b_1$) are those whose glass transition temperature is below 10° C., preferably below 0° C. These are, for example, elastomers based on $C_1$–$C_8$-alkylesters of acrylic acid, which may also contain further comonomers.

Preferred grafting bases $b_1$) are those which consist of $b_{11}$) from 70 to 99.9, preferably from 90 to 99%, by weight of at least one alkyl acrylate where the alkyl radical is of 1 to 8 carbon atoms, preferably n-butyl acrylate and/or 2-ethylhexyl acrylate, in particular n-butyl acrylate as the sole alkyl acrylate, $b_{12}$) from 0 to 30, in particular from 20 to 30%, by weight of a further copolymerizable monoethylenically unsaturated monomer, such as butadiene, isoprene, styrene, acrylonitrile, methyl methacrylate and/or vinyl methyl ether, and $b_{13}$) from 0.1 to 5, preferably from 1 to 4%, by weight of a copolymerizable, polyfunctional, preferably bi- or trifunctional, monomer which effects crosslinking.

Suitable bi- or polyfunctional crosslinking monomers $b_{13}$) of this type are monomers which preferably contain two, if necessary three or more, ethylenic double bonds which are capable of undergoing copolymerization and are not conjugated in the 1,3-positions. Examples of suitable crosslinking monomers are dinvyl benzene, diallyl maleate, diallyl fumarate, diallyl phthalate, triallyl cyanurate or triallyl isocyanate. The ester of acrylic acid with tricyclodecenyl alcohol has proven a particularly advantageous crosslinking monomer (cf. DE-A 12 60 135).

This type of grafting base is known per se and is described in the literature, for example in DE-A 31 49 358.

Preferred grafts $b_2$) are those in which $b_{21}$) is styrene or α-methylstyrene. In the case of component $b_2$), methyl methacrylate and the maleimides N-substituted by $C_1$–$C_4$-alkyl or by $C_6$–$C_{10}$-aryl, in partrcular by phenyl, have proven particularly suitable, in addition to acrylonitrile and maleic anhydride. Preferably used monomer mixtures are in particular styrene and acrylonitrile, α-methylstyrene and acrylonitrile, styrene, acrylonitrile and methyl methacrylate, and styrene and maleic anhydride. The grafts are obtainable by copolymerization of components $b_{21}$) and $b_{22}$).

If the grafting base $b_1$) of the graft polymers B) consists of component $b_{11}$) and if necessary $b_{12}$) and $b_{13}$), the term ASA rubbers is used. Their preparation is known per se and is described in, for example, DE-A 28 26 925, DE-A 31 49 358 and DE-A 34 14 118.

The graft copolymer B) can be prepared, for example, by the method described in German Patent 1,260,135.

The graft of the graft copolymer can be produced in one or two stages.

In the case of the one-stage synthesis of the graft, a mixture of the monomers $b_{21}$) and $b_{22}$) in the desired weight ratio in the range from 95:5 to 50:50, preferably from 90:10 to 65:35, is polymerized in the presence of the elastomer $b_1$) in a conventional manner (cf. for example German Laid-Open Application DOS 2,826,925), preferably in emulsion.

In the case of a two-stage synthesis of the graft $b_2$), the first stage generally accounts for from 20 to 70, preferably from 25 to 50%, by weight, based on $b_2$). Preferably only monoethylenically unsaturated aromatic hydrocarbons ($b_{21}$) are used for its preparation.

The second stage of the graft generally accounts for from 30 to 80, in particular from 50 to 75%, by weight, based in each case on $b_2$). Mixtures of the stated monoethylenically unsaturated aromatic hydrocarbons $b_{21}$) and monoethylenically unsaturated monomers $b_{22}$) in a weight ratio $b_{21}$)/$b_{22}$) of in general from 90:10 to 60:40, in particular from 80:20 to 70:30, are used for its preparation.

The conditions of the graft copolymerization are preferably chosen so that particle sizes of from 50 to 700 nm ($d_{50}$ value of the integral mass distribution) result. Measures for this purpose are known and are described in, for example, German Laid-Open Application DOS 2,826,925.

A coarse-particled rubber dispersion can be prepared directly by the seed latex process.

In order to obtain very tough products, it is often advantageous to use a blend of at least two graft copolymers having different particle sizes.

In order to achieve this, the particles of rubber are enlarged in a known manner, for example by agglomeration so that the latex has a bimodal structure (from 50 to 180 nm and from 200 to 700 nm).

In a preferred embodiment, a blend of two graft copolymers having particle diameters ($d_{50}$ value of the integral mass distribution) of from 50 to 180 nm and from 200 to 700 nm in a weight ratio of from 70:30 to 30:70 is used.

The chemical composition of the two graft copolymers is preferably the same, although the graft of the coarse-particled graft copolymer in particular may be produced in two stages.

Blends of components A) and B) in which the latter has a coarse-particled and a finely divided graft copolymer are described in, for example, German Laid-Open Application DOS 3,615,607. Blends of components A and B in which the latter has a two-stage graft are disclosed in EP-A 111 260.

The novel thermoplastic molding materials contain, as component C), from 1 to 79.9, preferably from 10 to 30%, by weight of a thermoplastic copolymer of c$_1$) from 50 to 95, preferably from 60 to 80%, by weight of a styrene or substituted styrene of the general formula I or a $C_1$–$C_8$-alkyl (meth)acrylate or a mixture thereof and c$_2$) from 5 to 50, preferably from 20 to 40%, by weight of acrylonitrile, methacrylonitrile, $C_1$–$C_8$-alkyl (meth)acrylates, maleic anhydride or maleimides N-substituted by $C_1$–$C_8$-alkyl or $C_6$–$C_{20}$-aryl groups or a mixture thereof.

The copolymers C) are resin-like, thermoplastic and rubber-free. Particularly preferred copolymers C) are those of styrene with acrylonitrile and, if required, with methyl methacrylate, of α-methylstyrene with acrylonitrile and, if required, with methyl methacrylate or of styrene and α-methylstyrene with acrylonitrile and, if required, with methyl methacrylate and of styrene and maleic anhydride. A plurality of the copolymers described may furthermore be used simultaneously.

Such copolymers are frequently formed as by-products in the graft polymerization for the preparation of component B), particularly when large amounts of monomers are grafted onto small amounts of rubber.

The copolymers C) are known per se and can be prepared by free radical polymerization, in particular by emulsion, suspension, solution and mass polymerization. They have viscosity numbers of from 40 to 160, corresponding to a weight average molecular weight $\overline{M}_w$ of from 40,000 to 2,000,000.

The polyolefins used as component D) are present in the novel thermoplastic molding materials in an amount of from 0.1 to 40, preferably from 1 to 10%, by weight.

Examples of suitable polyolefins are homo- and/or copolymers of ethylene, of propylene or of other terminal alkenes. For example, polyethylenes prepared by the high pressure, medium pressure or low pressure process and having densities of from 0.91 to 0.97 g/cm$^3$ or copolymers of ethylene, for example with vinyl esters, such as vinyl acetate or vinyl propionate, with acrylates or with propylene, are suitable. The comonomer content of the ethylene copolymers is from 1 to 65, preferably from 10 to 45%, by weight. The Melt Flow Index of the ethylene polymers may vary within a wide range and is preferably from 0.5 to 40 g/10 min (MFI 190° C./2.16 kg load). A preferred polyolefin is high density polyethylene (from 0.94 to 0.97 g/cm$^3$), prepared by the Phillips process (medium pressure process). Another preferred polyolefin is linear low density polyethylene (from 0.91 to 0.94 g/cm$^3$), prepared by the gas phase process. Filler-containing polyethylene should also be mentioned, a preferred filler in this case being calcium carbonate which is in the form of chalk and particularly preferably has a mean particle diameter of from 0.1 to 20 μm.

Further examples are polypropylene, which can be prepared, for example, by the gas phase process using Ziegler-Natta catalysts and has a melt flow index (MFI 190° C./5 kg load) of from 0.1 to 90 g/10 min. Propylene copolymers which in turn preferably consist of from 20 to 65% by weight of propylene homopolymer and from 35 to 80% by weight of random propylene copolymer with polymerized $C_2$–$C_{10}$-alk-1-enes may also be mentioned. A propylene copolymer which contains from 35 to 65% by weight of propylene homopolymer as well as from 35 to 65% by weight of random propylene copolymer is preferred. The random propylene copolymer contains polymerized $C_2$–$C_{10}$-alkenes, for example ethylene, but-1-ene, pent-1-ene, hex-1-ene, hept-1-ene or oct-1-ene or mixtures of these comonomers, ethylene or but-1-ene being preferably used. The amount of comonomers in the random propylene copolymer should be such that the comonomer content in the propylene copolymer does not fall below 15, preferably 20%, by weight.

These propylene copolymers are prepared by polymerization with the aid of Ziegler-Natta catalysts, preferably in the gas phase using the polymerization reactors conventionally used in industry.

In general, processes for the preparation of polyolefins are known and are described in, for example, Ullmanns Encyklopädie der technischen Chemie, 4th Edition, Volume 19, pages 167 to 226.

Copolymers of the olefins with polar monomers, such as monomers containing acid or anhydride groups, are also preferred. Particular examples here are acrylic acid and methacrylic acid as well as (meth)acrylates, (meth)acrylamides and (meth)acrylonitrile, and also base-containing monomers, such as N,N-dimethylaminoethyl acrylate. The amount of these stated comonomers is in general from 0 to 50% by weight, based on the total weight of component D).

The preparation of such copolymers is known to the skilled worker.

The novel thermoplastic molding materials may contain, as component E), up to 50, in particular from 0.1 to 20%, by weight of a fibrous or particulate filler or a mixture thereof. These are preferably commercial products. Processing assistants and stabilizers, such as UV stabilizers, lubricants and antistatic agents, are usually used in amounts of from 0.01 to 5% by weight, whereas reinforcing agents, such as carbon fibers and glass fibers, are employed in amounts of from 5 to 40% by weight.

The glass fibers used may consist of E, A or C glass and are preferably provided with a size and an adhesion promoter. Their diameter is in general from 6 to 20 μm. Both rovings and cut glass fibers having a length of from 1 to 10 mm, preferably from 3 to 6 mm, may be used.

Fillers and reinforcing materials, such as glass spheres, mineral fibers, whiskers, alumina fibers, mica, quartz powder and wollastonite, may also be added.

Metal flakes (for example aluminum flakes from Transmet Corp.), metal powders, metal fibers, metal-coated fillers (for example nickel-coated glass fibers) and other additives which shield against electromagnetic waves may also be mentioned. Aluminum flakes (K 102 from Transmet) for EMI (electro-magnetic interference) purposes are particularly suitable, as well as mixtures of this material with additional carbon fibers, conductivity carbon black and nickel-coated carbon fibers.

The novel molding materials may also contain further additives which are typical for, and conventionally used in, polycarbonates, SAN polymers and graft copolymers based on ASA or blends thereof. Examples of such additives are dyes, pigments, antistatic agents, antioxidants and in particular the lubricants which are required for further processing of the molding material, for example in the production of moldings or shaped articles.

The novel thermoplastic molding materials are prepared by conventional methods, by mixing the components. It may be advantageous to premix individual components. Mixing the components in solution and removal of the solvents is also possible.

Suitable organic solvents for components A) to D) and the additives of group E) are, for example, chlorobenzene, mixtures of chlorobenzene and methylene chloride or mixtures of chlorobenzene and aromatic hydrocarbons, e.g. toluene.

The evaporation of the solvent mixtures can be effected, for example, in devolatilization extruders.

Components A), B), C), D) and, if required, E), which, for example, are dry, can be mixed by all known methods. Preferably, however, mixing of said components is carried out at from 200° to 320° C. by extruding, kneading or roll-milling the components together, if necessary the components being isolated beforehand from the solution obtained in the polymerization or from the aqueous dispersion.

The novel thermoplastic molding materials can be processed by the known methods for processing thermoplastics, for example by extrusion, injection molding, calendering, blow molding, compression molding or sintering.

The novel thermoplastic molding materials have in particular good toughness, good stability to chemicals and to weathering and good flow.

EXAMPLES

The median particle size and the particle size distribution were determined from the integral mass distribution. The median particle sizes are in all cases the weight average of the particle sizes as determined by means of an analytical ultracentrifuge according to the method of W. Scholtan and H. Lange, Kolloid-Z und Z.-Polymere 250 (1972), 782–796. The ultracentrifuge measurement gives the integral mass distribution of the particle diameter for a sample. From this it is possible to determine the percentage by weight of the particles which has a diameter equal to or smaller than a certain size. The median particle diameter, which is also referred to as the $d_{50}$ value of the integral mass distribution, is defined as the particle diameter at which 50% by weight of the particles have a diameter smaller than the diameter which corresponds to the $d_{50}$ value. value. Likewise, 50% by weight of the particles then a diameter larger than the $d_{50}$ value. To characterize the width of the particle size distribution of the rubber particles, the $d_{10}$ and $d_{90}$ values obtained from the integral mass distribution are used in addition to the $d_{50}$ value (median particle diameter). The $d_{10}$ and $d_{90}$ values of the integral mass distribution are defined similarly to the $d_{50}$ value, except that they relate to 10 and 90% by weight, respectively, of the particles. The quotient $$\frac{d_{90} - d_{10}}{d_{50}} = Q$$

is a measure of the width of the particle size distribution.

The following components were used:

A) A commercial polycarbonate based on bisphenol A and having a relative solution viscosity $\eta_{rel}$ of 1.3 ml/g, measured in a 0.5% strength by weight solution in methylene chloride at 23° C.

B1) A finely divided graft copolymer prepared from $\beta_1$) 16 g of butyl acrylate and 0.4 g of tricyclodecenyl acrylate in 150 g of water, which were heated to 60° C. with the addition of 1 g of the sodium salt of a $C_{12}$–$C_{18}$-paraffinsulfonic acid, 0.3 g of potassium persulfate, 0.3 g of sodium bicarbonate and 0.15 g of sodium pyrophosphate while stirring. 10 minutes after initiation of the polymerization reaction, a mixture of 82 g of butyl acrylate and 1.6 g of tricyclodecenyl acrylate was added in the course of 3 hours. After the end of the monomer addition, stirring was continued for a further hour. The resulting latex of the crosslinked butyl acrylate polymer had a solids content of 40% by weight, the median particle size (weight average) was determined as 76 nm and the particle size distribution was narrow (quotient Q=0.29).

$\beta_2$) 150 g of the polybutyl acrylate latex obtained according to $\beta_1$) were mixed with 40 g of a mixture of styrene and acrylonitrile (weight ratio 75:25) and 60 g of water, a further 0.03 g of potassium persulfate and 0.05 g of lauroyl peroxide were added and the mixture was then heated at 65° C. for 4 hours while stirring. After the end of the graft copolymerization, the polymer was precipitated from the dispersion by means of calcium chloride solution at 95° C., washed with water and dried in a warm air stream. The degree of grafting of the graft copolymer was 35% and the particle size was 91 nm.

B2) A coarse-particled graft copolymer which was prepared as follows:

$\beta_3$) 1.5 g of the latex prepared according to $\beta_1$) were initially taken, 50 g of water and 0.1 g of potassium persulfate were added and then a mixture of 49 g of butyl acrylate and 1 g of tricyclodecenyl acrylate on the one hand and a solution of 0.5 g of the sodium salt of a $C_{12}$–$C_{18}$-sulfonic acid in 25 g of water on the other hand were introduced at 60° C. in the course of 3 hours. Polymerization was then continued for 2 hours. The resulting latex of the crosslinked butyl acrylate polymer had a solids content of 40%. The median particle size (weight average of the latex) was determined as 430 nm and the particle size distribution was narrow (Q=0.1).

$\beta_4$) 150 g of the latex prepared according to $\beta_3$) were mixed with 20 g of styrene and 60 g of water, a further 0.03 g of potassium persulfate and 0.05 g of lauroyl peroxide were added and the mixture was then heated at 65° C. for 3 hours while stirring. The dispersion obtained in this graft copolymerization was then polymerized with 20 g of a mixture of styrene and acrylonitrile in a weight ratio of 75:25 for a further 4 hours. The reaction product was then precipitated from the dispersion by means of a calcium chloride solution at 95° C., separated off, washed with water and dried in a warm air stream. The degree of grafting of the graft copolymer was determined as 35%; the median particle size of the latex particles was 510 nm.

C) A copolymer of styrene and acrylonitrile in a weight ratio of 80 20, having a viscosity number of 83 ml/g (measured in a 0.5% strength by weight solution in dimethylformamide at 23° C.) and prepared by continuous solution polymerization by a process as described, for example, in Kunststoff-Handbuch, Vieweg-Daumiller, Volume V (Polystyrol), Carl-Hanser-Verlag, Munich 1969, page 124, line 12 et seq.

D1) An ethylene/acrylic acid copolymer containing 8% by weight of acrylic acid and having a melt flow index MFI (190° C./2.16 kg load) of 20 g/10 min and a density of 0.935 g/cm$^3$.

D2) A polyethylene having a melt flow index MFI (190° C./2.16 kg load) of 21 g/10 min and a density of 0.952 g/cm$^3$.

D3) A polyethylene having a melt flow index MFI (190° C./2.16 kg load) of 17 g/10 min and a density of 0.915 g/cm$^3$.

E) A high molecular weight multicomponent ester having a viscosity of from 110 to 150 mPa.s at 80° C. (Loxiol® G 70 S from Henkel).

EXAMPLES 1 TO 9

Preparation of the Thermoplastic Molding Materials

Components A) to E) were mixed in a twin-screw extruder (ZSK 30 from Werner & Pfleiderer) at 260° C. and extruded, and the extrudates were cooled and granulated.

COMPARATIVE EXAMPLES V1 TO V3

The procedure was as in Examples 1 to 9, but without the addition of a polyolefin (Component D).

The compositions and properties of the thermoplastic molding materials are summarized in the Table.

The melt flow index MFI was determined according to DIN 53,735 at 260° C. and under a load of 5 kg. The notched impact strength $a_k$ was determined according to DIN 53, 453 using standard small bars measuring 50 mm × 6 mm × 4 mm (injection temperature: 260° C.) at 0° C. and −40° C.

particle size of from 50 to 180 nm ($d_{50}$ value of the integral mass distribution) consisting of b1) from 40 to 80% by weight of a grafting base of an elastomeric polymer based on alkyl acrylates where the alkyl radical is of 1 to 8 carbon atoms and having a glass transition temperature below 10° C. and b2) from 20 to 60% by weight of a graft of b21) from 50 to 95% by weight of styrene or a substituted styrene of the formula I

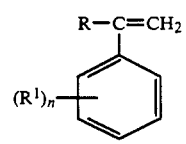

where R is alkyl of 1 to 8 carbon atoms or hydrogen, $R^1$ is alkyl of 1 to 8 carbon atoms and n is 0, 1, 2 or 3, or a $C_1$–$C_8$-alkyl (meth)acrylate or a mixture thereof and b22) from 5 to 50% by weight of acrylonitrile, methacrylonitrile, $C_1$–$C_8$-alkyl (meth)acrylates, maleic anhydride or maleimides N-substituted by $C_1$–$C_8$-alkyl or $C_6$–$C_{20}$-aryl groups or a mixture thereof, C) from 1 to 79.9% by weight of a thermoplastic copolymer of c1) from 50 to 95% by weight of a styrene or substituted styrene of the formula I or a $C_1$–$C_8$-alkyl (meth)acrylate or a mixture thereof and c2) from 5 to 50% by weight of acrylonitrile, methacrylonitrile, $C_1$–$C_8$-alkyl (meth)acrylates, maleic anhydride or maleimides N-substituted by $C_1$–$C_8$-alkyl or $C_6$–$C_{20}$-aryl groups or a mixture thereof, D) from 0.1 to 40% by weight of at least one polyolefin and E) from 0 to 50% by weight of a fibrous or particulate filler or a mixture thereof.

2. A thermoplastic molding material as claimed in claim 1, which contains component A) in an amount of from 40 to 75% by weight,

TABLE

| Example | Components [% by weight] | | | | | | | | MFI [g/10 min] | $a_k$ (at 0° C.) [kJ/m$^2$] | $a_k$ (at −40° C.) [kJ/m$^2$] |
|---|---|---|---|---|---|---|---|---|---|---|---|
| | A | B1 | B2 | C | D1 | D2 | D3 | E | | | |
| 1 | 57.5 | 10 | 10 | 20 | 2 | — | — | 0.5 | 12 | 19 | 3 |
| 2 | 55.5 | 10 | 10 | 20 | 4 | — | — | 0.5 | 15 | 20 | 3 |
| 3 | 51.5 | 10 | 10 | 20 | 8 | — | — | 0.5 | 19 | 23 | 4 |
| 4 | 57.5 | 10 | 10 | 20 | — | 2 | — | 0.5 | 13 | 21 | 5 |
| 5 | 55.5 | 10 | 10 | 20 | — | 4 | — | 0.5 | 18 | 22 | 4 |
| 6 | 51.5 | 10 | 10 | 20 | — | 8 | — | 0.5 | 21 | 33 | 4 |
| 7 | 57.5 | 10 | 10 | 20 | — | — | 2 | 0.5 | 13 | 19 | 4 |
| 8 | 55.5 | 10 | 10 | 20 | — | — | 4 | 0.5 | 19 | 26 | 4 |
| 9 | 51.5 | 10 | 10 | 20 | — | — | 8 | 0.5 | 22 | 20 | 4 |
| V1 | 59.5 | 10 | 10 | 20 | — | — | — | 0.5 | 10 | 19 | 3 |
| V2 | 59.5 | 20 | — | 20 | — | — | — | 0.5 | 9 | 15 | 3 |
| V3 | 59.5 | — | 20 | 20 | — | — | — | 0.5 | 10 | 17 | 3 |

We claim:

1. A thermoplastic molding material containing, as essential components,

A) from 10 to 88.9% by weight of at least one polycarbonate,

B) from 30 to 70% by weight of a coarse-particled graft copolymer which has a median particle size of from 200 to 700 nm ($d_{50}$ value of the integral mass distribution) and from 70 to 30% by weight of a finely divided graft copolymer which has a median component B) in an amount of from 10 to 25% by weight, component C) in an amount of from 10 to 30% by weight, component D) in an amount of from 1 to 10% by weight and component E) in an amount of from 0.1 to 20% by weight.

3. A thermoplastic molding material as claimed in claim 1, wherein the grafting base $b_1$) consists of $b_{11}$) from 70 to 99.9% by weight of at least one alkyl acrylate where the alkyl radical is of 1 to 8 carbon atoms, $b_{12}$) from 0 to 30% by weight of at least one copolymerizable monoethylenically unsaturated monomer and $b_{13}$) from 0.1 to 5% by weight of a copolymerizable polyfunctional crosslinking monomer.

4. A thermoplastic molding material as claimed in claim 1, wherein a homo- or copolymer of ethylene or of propylene or of a mixture thereof is used as component D).

5. A thermoplastic molding material as claimed in claim 1, wherein at least one copolymer which has polar monomer units is used as component D).

6. A thermoplastic molding material as claimed in claim 1, wherein at least one copolymer which has monomer units possessing free acid groups or anhydride groups is used as component D).

7. A molding obtainable from a thermoplastic molding material as claimed in claim 1.

* * * * *